(12) United States Patent
Suzuki

(10) Patent No.: US 9,760,274 B2
(45) Date of Patent: Sep. 12, 2017

(54) INFORMATION PROCESSING APPARATUS, INFORMATION PROCESSING METHOD, AND COMPUTER-READABLE STORAGE MEDIUM

(71) Applicant: CANON KABUSHIKI KAISHA, Tokyo (JP)

(72) Inventor: Ryousuke Suzuki, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 346 days.

(21) Appl. No.: 14/059,862

(22) Filed: Oct. 22, 2013

(65) Prior Publication Data

US 2014/0123023 A1 May 1, 2014

(30) Foreign Application Priority Data

Oct. 30, 2012 (JP) ................. 2012-239278

(51) Int. Cl.
| | |
|---|---|
| *G06F 3/048* | (2013.01) |
| *G06F 3/0487* | (2013.01) |
| *G06F 3/0484* | (2013.01) |
| *G06F 3/01* | (2006.01) |
| *H04N 1/00* | (2006.01) |
| *H04N 1/44* | (2006.01) |
| *H04N 101/00* | (2006.01) |

(52) U.S. Cl.
CPC ............ *G06F 3/0487* (2013.01); *G06F 3/011* (2013.01); *G06F 3/0484* (2013.01); *H04N 1/00347* (2013.01); *H04N 1/00509* (2013.01); *H04N 1/442* (2013.01); *H04N 1/00411* (2013.01); *H04N 1/00474* (2013.01); *H04N 1/00482* (2013.01); *H04N 2101/00* (2013.01); *H04N 2201/0084* (2013.01); *H04N 2201/0094* (2013.01)

(58) Field of Classification Search
CPC ...... G06F 3/0487; G06F 3/011; G06F 3/0484; H04N 1/00347; H04N 1/00509; H04N 1/442
USPC ........................................................ 715/750
See application file for complete search history.

(56) References Cited

U.S. PATENT DOCUMENTS

| | | | | |
|---|---|---|---|---|
| 5,991,429 A | * | 11/1999 | Coffin ................ | G06K 9/00255 382/118 |
| 7,634,103 B2 | * | 12/2009 | Rubinstenn .......... | A45D 44/005 345/619 |
| 7,643,671 B2 | * | 1/2010 | Dong ................. | G06K 9/00288 345/426 |

(Continued)

FOREIGN PATENT DOCUMENTS

| | | |
|---|---|---|
| JP | 2007-116602 A | 5/2007 |
| JP | 2009-186588 A | 8/2009 |

(Continued)

*Primary Examiner* — David Phantana Angkool
(74) *Attorney, Agent, or Firm* — Canon U.S.A. Inc., IP Division

(57) ABSTRACT

An information processing apparatus includes an image capturing unit configured to generate image data by capturing an image, an identification unit configured to identify a plurality of users based on the image data, a determination unit configured to determine a priority of the plurality of users, and a display unit configured to display a user interface for at least one user among the plurality of users according to the priority.

20 Claims, 10 Drawing Sheets

(56) References Cited

U.S. PATENT DOCUMENTS

| | | | | |
|---|---|---|---|---|
| 8,010,402 B1* | 8/2011 | Sharma | G06Q 10/00 | 705/14.49 |
| 8,064,645 B1* | 11/2011 | Sezille | G06K 9/00013 | 382/115 |
| 8,085,992 B1* | 12/2011 | Sahin | G06K 9/00013 | 382/115 |
| 8,165,352 B1* | 4/2012 | Mohanty | G06K 9/00288 | 382/115 |
| 8,165,409 B2* | 4/2012 | Ritzau | G06K 9/228 | 382/115 |
| 8,194,938 B2* | 6/2012 | Wechsler | G06K 9/00288 | 382/118 |
| 8,326,091 B1* | 12/2012 | Jing | G06F 17/30265 | 382/305 |
| 8,711,381 B2* | 4/2014 | Li | H04N 1/0097 | 358/1.14 |
| 8,826,863 B2* | 9/2014 | Skvorc, II | 119/712 | |
| 8,855,369 B2* | 10/2014 | Kikkeri | G06K 9/00221 | 382/103 |
| 8,868,917 B2* | 10/2014 | Conwell | G06Q 10/00 | 707/758 |
| 9,082,235 B2* | 7/2015 | Lau | G07C 9/00 | |
| 9,086,827 B2* | 7/2015 | Nakane | G06F 3/1207 | |
| 9,307,396 B2* | 4/2016 | Jung | H04M 1/7258 | |
| 2005/0007619 A1* | 1/2005 | Minato | G06F 21/10 | 358/1.14 |
| 2006/0056666 A1* | 3/2006 | Mizutani | G07C 9/00158 | 382/118 |
| 2007/0177185 A1* | 8/2007 | Ogura | G06F 3/1208 | 358/1.14 |
| 2008/0004950 A1* | 1/2008 | Huang | G06Q 30/02 | 705/14.67 |
| 2008/0004951 A1* | 1/2008 | Huang | G06Q 30/02 | 705/14.67 |
| 2010/0073720 A1* | 3/2010 | Wakui | G06F 3/1219 | 358/1.15 |
| 2010/0205541 A1* | 8/2010 | Rapaport | G06Q 10/10 | 715/753 |
| 2013/0222827 A1* | 8/2013 | Watanabe | G06F 3/122 | 358/1.13 |
| 2015/0055168 A1* | 2/2015 | Kato | G06F 3/1222 | 358/1.15 |
| 2016/0012465 A1* | 1/2016 | Sharp | G06Q 20/18 | 705/14.17 |
| 2016/0105568 A1* | 4/2016 | Yamashita | H04N 1/00204 | 358/1.14 |

FOREIGN PATENT DOCUMENTS

| | | |
|---|---|---|
| JP | 2010-016432 A | 1/2010 |
| JP | 2010-020616 A | 1/2010 |

* cited by examiner

INFORMATION PROCESSING APPARATUS, INFORMATION PROCESSING METHOD, AND COMPUTER-READABLE STORAGE MEDIUM

BACKGROUND

Field

Aspects of the present invention generally relate to an information processing apparatus capable of displaying a user interface for a user.

Description of the Related Art

Conventionally, an authentication method causes a user to input a user name and a password, and authenticates the user based on the user name and the password.

Moreover, Japanese Patent Application Laid-Open No. 2007-116602 discusses an authentication method in which an image capturing unit such as a charge-coupled device (CCD) is arranged in an information processing apparatus. In this method, a user is identified based on an image captured by the image capturing unit and authenticated. Thus, the user may not need to input a user name and a password.

Since an information processing apparatus such as a multifunction peripheral (MFP) is often shared by a plurality of users, a plurality of users may be present in front of the information processing apparatus. For example, one user is using an information processing apparatus, while another user is waiting near the information processing apparatus. In such a case, according to the authentication method using the image capturing unit, the image capturing unit captures face images of the plurality of users. This causes faces of the plurality of users to be detected.

However, the conventional authentication method using the image capturing unit is not designed to deal with a plurality of users. Consequently, if the plurality of users is detected, the authentication method cannot determine which user is to be permitted to operate the information processing apparatus among the plurality of users.

SUMMARY

According to an aspect of the present invention, an information processing apparatus includes an image capturing unit configured to generate image data by capturing an image, an identification unit configured to identify a plurality of users based on the image data, a determination unit configured to determine a priority of the plurality of users, and a display unit configured to display a user interface for at least one user among the plurality of users according to the priority.

Further features of the present disclosure will become apparent from the following description of exemplary embodiments with reference to the attached drawings.

DESCRIPTION OF THE EMBODIMENTS

The exemplary embodiments described below are not seen to be limiting, and not all of the features described in the exemplary embodiments are necessary in order to carry out feature(s) of the embodiments.

Figure 1:
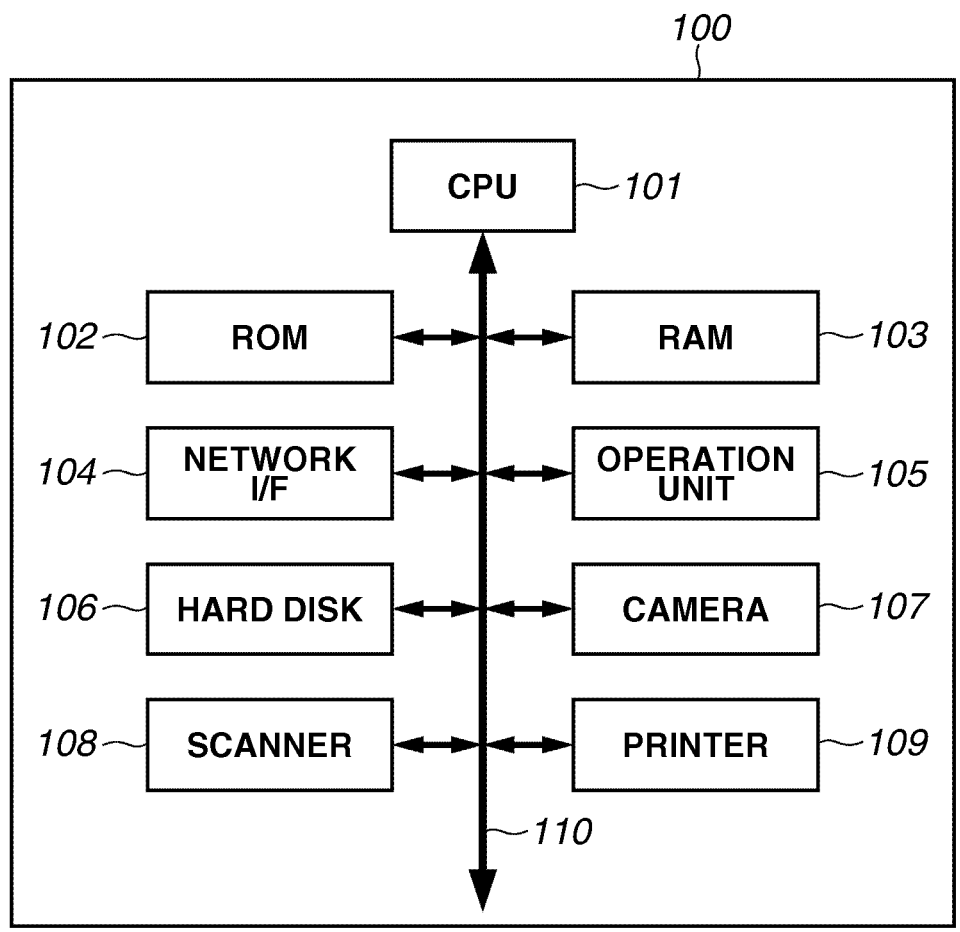
FIG. 1 is a diagram illustrating a hardware configuration of an information processing apparatus according to an exemplary embodiment.

FIG. 1 is a diagram illustrating a hardware configuration of an information processing apparatus according to a first exemplary embodiment. In FIG. 1, a MFP 100 is described as an example of the information forming apparatus.

A central processing unit (CPU) 101 reads out a control program stored in a read only memory (ROM) 102 or a hard disk 106 to a random access memory (RAM) 103, and executes the control program, thereby controlling the entire MFP 100 according to the control program. The ROM 102 stores, for example, the control program. The RAM 103 is a main memory of the CPU 101. The RAM 103 is also used as a temporary storage area. Moreover, the RAM 103 stores job information of a job input to the MFP 100 and job data to be processed by the job. The job information includes user identification information identifying a user who has input the job, and status information indicating a status of the job. The hard disk 106 can store such information instead of the RAM 103.

A network interface 104 communicates with external devices via a network. An operation unit 105 includes a hardware keypad 201 and a liquid crystal display 202 with a touch panel.

A camera 107 captures an image of one user or images of a plurality of users present in front of the operation unit 105. A scanner 108 reads a document according to a scan job, and generates image data. A printer 109 prints print data on a sheet according to a print job input from an external device to the MFP 100. Moreover, the printer 109 prints the image data generated by the scanner 108 on a sheet according to a copy job. When a user inputs a copy execution instruction using the operation unit 105, the copy job is input to the MFP 100.

A system bus 110 electrically connects each of these devices.

Figure 2:
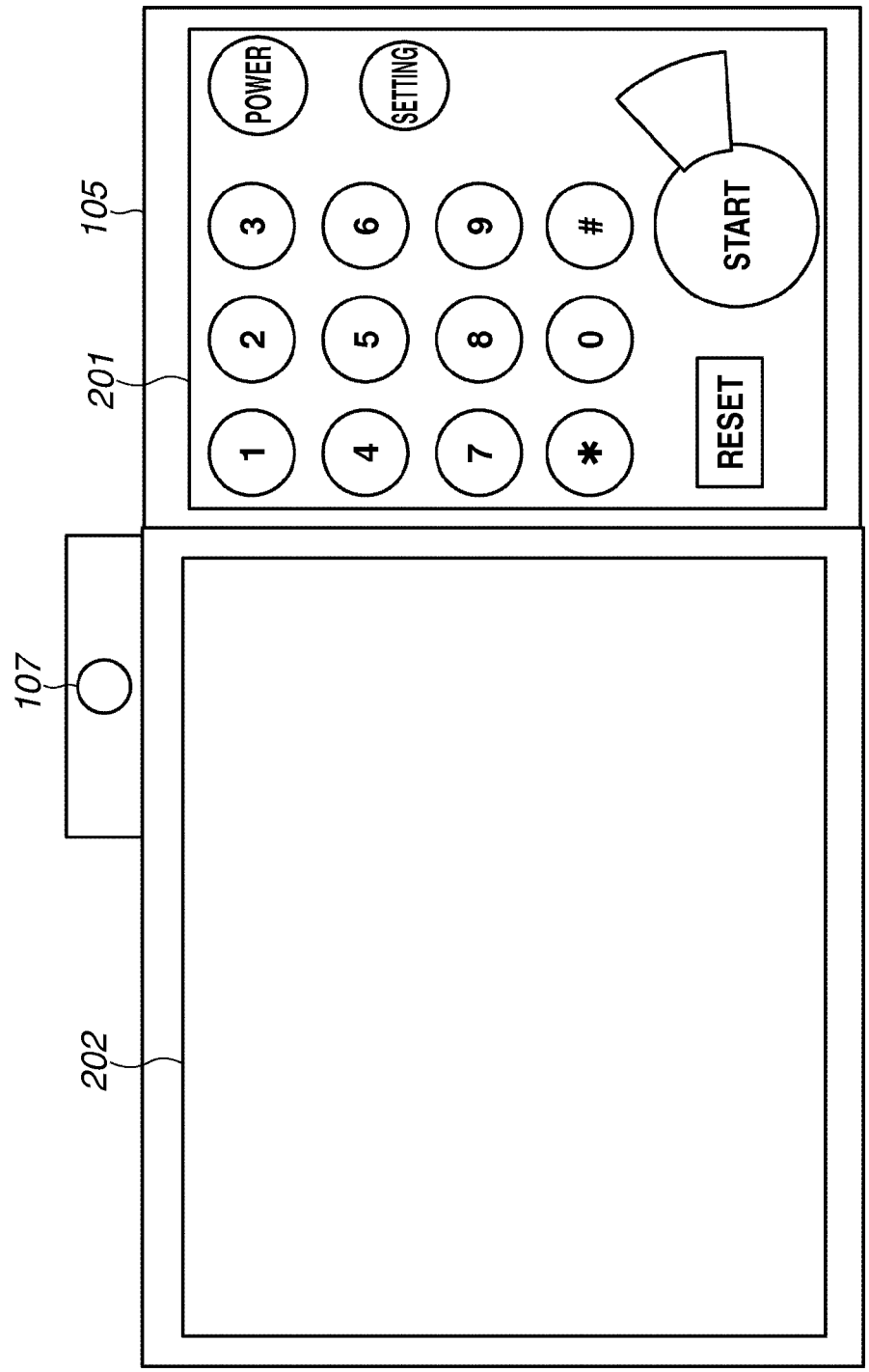
FIG. 2 is a diagram illustrating an operation unit.

FIG. 2 is a diagram illustrating the operation unit 105. The operation unit 105 includes the hardware keypad 201, and the liquid crystal display 202 with a touch panel. A user presses the hardware keypad 201 when performing various settings and various operations. The liquid crystal display 202 displays various information and virtual buttons. The touch panel detects a position pressed with the user's finger, and the CPU 101 determines whether the virtual button is pressed based on a detection result of the touch panel. The CPU 101 stores image data in a video memory (not illustrated), and the liquid crystal display 202 displays a user interface image based on the image data stored in the video memory. The video memory stores the image data indicating an image to be displayed on the liquid crystal display 202. The video memory may be stored in the RAM 103 or built in the liquid crystal display 202.

The camera 107 with CCD is arranged near the operation unit 105. The camera 107 may be a digital camera capable of capturing a still image, or a video camera capable of capturing both still and moving images. It is desirable that the camera 107 captures an image of a viewing angle range of the liquid crystal display 202.

The MFP 100 displays a user interface image on the liquid crystal display 202. The MFP 100 receives an instruction from a user through the hardware keypad 201 and the touch panel, and executes various processing according to the instruction. The camera 107 captures an image in front of the operation unit 105, and the MFP 100 detects a user as a login candidate based on the captured image.

Figure 3:
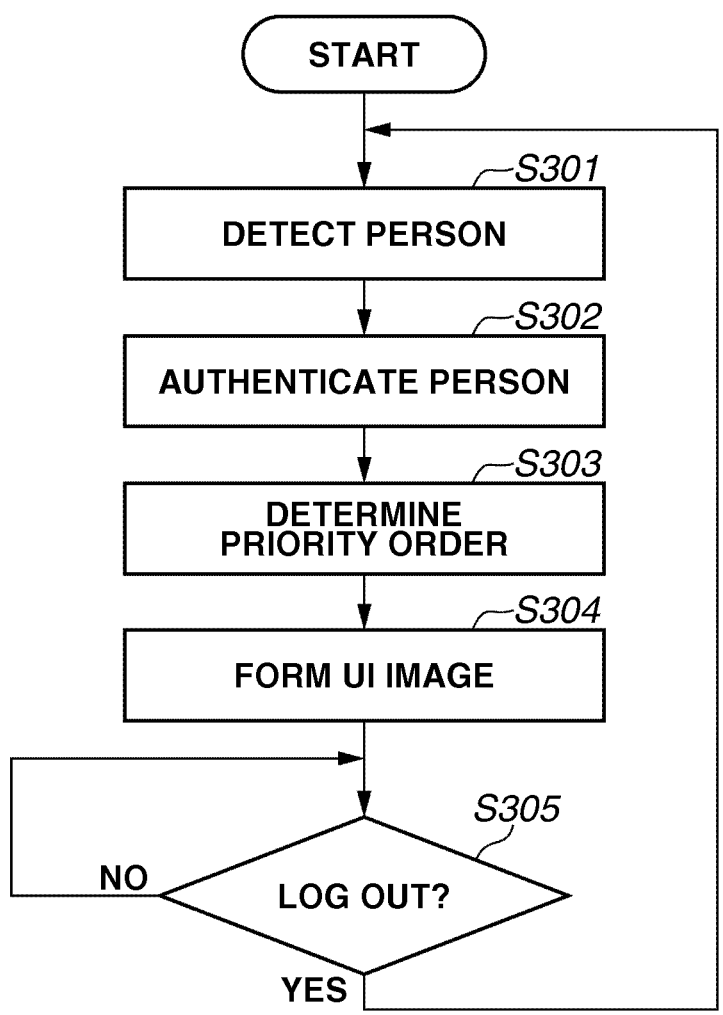
FIG. 3 is a flowchart illustrating information processing executed by an MFP.

FIG. 3 is a flowchart illustrating information processing executed by the MFP 100. The CPU 101 executes control programs based on flowcharts illustrated in FIGS. 4, 5, and 6, so that the MFP 100 executes the information processing illustrated in FIG. 3.

In the first exemplary embodiment, a method for facilitating the login of a user to the MFP 100 by using the camera 107 is described. Even if there is a plurality of users in front of the MFP 100, the CPU 101 can determine one user as a login user among the plurality of users by using the camera 107.

Figure 4:
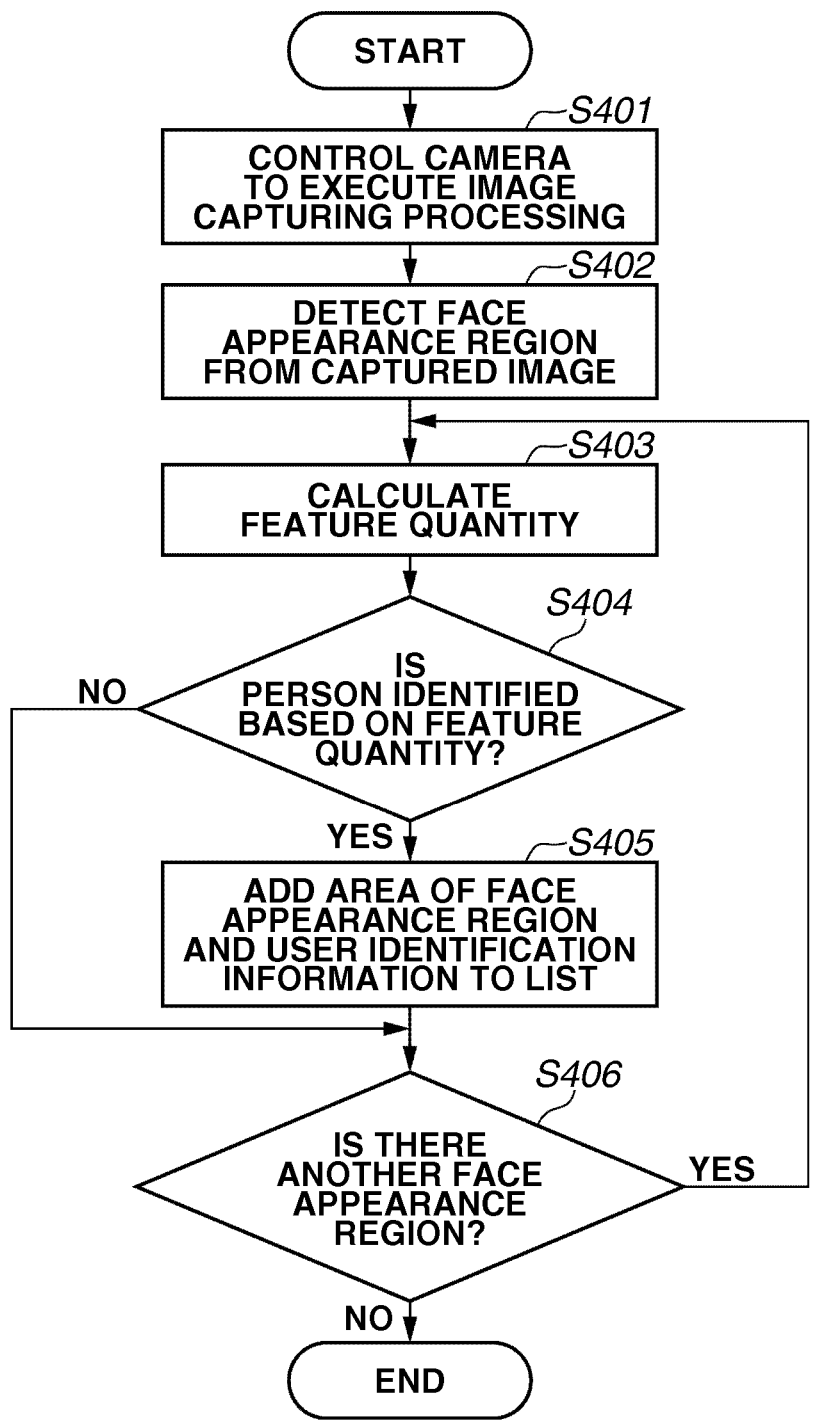
FIG. 4 is a flowchart illustrating person detection processing in detail.

In step S301, the CPU 101 detects a person. FIG. 4 is a flowchart illustrating person detection processing in detail.

In step S401, the CPU 101 controls the camera 107 to execute image capturing processing. The image captured in step S301 is stored in the RAM 103 as bitmap image data.

In step S402, the CPU 101 performs image processing on the bitmap image data stored in the RAM 103, and detects one or a plurality of regions in each of which a face of the user is shown (hereinafter referred to as a face appearance region). Accordingly, the CPU 101 detects all the face appearance regions. In the present exemplary embodiment, the Haar-like feature classification technique is used as a method for detecting the face appearance region.

Feature quantity data indicating a feature of the face of the user is generated beforehand by machine learning. According to the Haar-like feature classification technique, normalization processing by gray-scale conversion or edge detection processing is performed on the bitmap image data.

In step S403, the CPU 101 calculates a feature quantity from one of the face appearance regions detected in step S402. With the Eigenface technique, an orthogonal basis called an eigenface is determined beforehand. This orthogonal basis is used to determine a density value vector of the face image, and the Karhunen-Loeve expansion is applied to the density value vector, thereby calculating the feature quantity.

The Haar-like feature classification technique and the Eigenface technique are publicly known. In the present exemplary embodiment, the feature quantity is calculated by using these publicly known techniques. However, a different technique may be used to calculate the feature quantity.

In step S404, the CPU 101 determines whether the user is identified based on the feature quantity calculated in step S403. The CPU 101 accesses a database (hereinafter called a first database) which associates the feature quantity of each user being calculated by the Eigenface technique beforehand with private information of each user. The CPU 101 identifies the user by comparing the feature quantity calculated in step S403 with the feature quantity registered in the first database. The first database may be stored in the hard disk 106 or a server on the network connected to the MFP 100. The private information registered in the first database includes user identification information.

If the user is identified (YES in step S404), the operation proceeds to step S405. In step S405, the CPU 101 acquires the user identification information from the first database to calculate an area of the face appearance region showing a face of the user, and adds the user identification information and the area to a user list. The user list is generated on the RAM 103.

In step S406, the CPU 101 determines whether there is another face appearance region for which a feature quantity is not calculated. If there is another face appearance region (YES in step S406), the CPU 101 executes the processing in steps S403 through S405 for this face appearance region. The CPU 101 executes the processing in steps S403 through S405 for each of all the face appearance regions detected in step S402.

Figure 5:
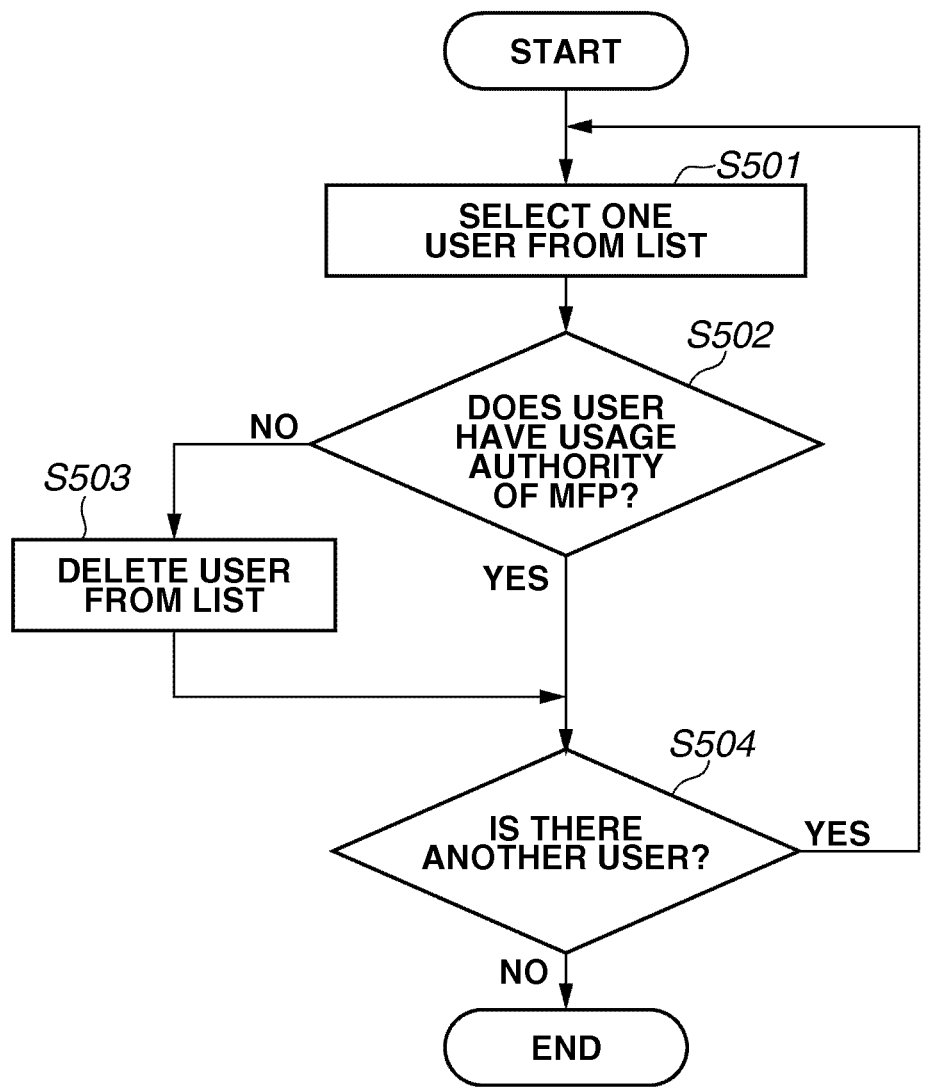
FIG. 5 is a flowchart illustrating person authentication processing in detail.

When the processing illustrated in FIG. 4 ends, then in step S302, the CPU 101 authenticates the person. In the person authentication processing, the CPU 101 verifies whether each of the identified users has a usage authority of the MFP 100. FIG. 5 is a flowchart illustrating the person authentication processing in detail.

In step S501, the CPU 101 selects user identification information of one user from the user list. In FIG. 5, the CPU 101 selects the user identification information in order from the top of the list.

In step S502, the CPU 101 determines whether the user has the usage authority of the MFP 100 based on the user identification information selected in step S501. The private information registered in the first database includes MFP identification information to identify an MFP, which can be used by each user. The CPU 101 compares the user identification information selected in step S501 with the user identification information registered in the first database, and acquires the MFP identification information corresponding to the user identification information from the first database. Accordingly, the CPU 101 determines whether the acquired MFP identification information indicates the MFP 100. If the acquired MFP identification information indicates the MFP 100, the CPU 101 determines that the user has the usage authority of the MFP 100 (YES in step S502), and the operation proceeds to step S504.

In the person authentication processing, a database different from the first database used in step S404 may be used. In such a case, for example, the CPU 101 accesses a database (hereinafter called a second database) in which user identification information of users having the usage authorities of the MFP 100 is registered. Then, the CPU 101 determines whether the user identification information selected in step S501 is registered in the second database. If the user identification information selected in step S501 is registered in the second database, the CPU 101 determines that the user has the usage authority of the MFP 100 (YES in step S502).

If the CPU 101 determines that the user does not have the usage authority of the MFP 100 (NO in step S502), then in step S503, the CPU 101 deletes the user identification information of this user from the user list.

The MFP 100 may execute both of first authentication processing using the camera 107, and second authentication processing using a username and a password. In such a case, there is a possibility that a certain user may be set to have the usage authority of the MFP 100 only if the certain user is authenticated by the second authentication processing. For such a setting, an attribute value indicating whether each user is permitted to log in to the MFP 100 by the first authentication processing may be registered in the first database. If an attribute value indicating that the login to the MFP 100 is not permitted by the first authentication processing is associated with the user identification information and registered in the first database, the CPU 101 deletes the user identification information from the user list.

In step S504, the CPU 101 determines whether there is another piece of user identification information in the user list. If there is another piece of user identification information (YES in step S504), the operation returns to step S501 for this user identification information. When the usage authorities of all the users are determined, the processing illustrated in FIG. 5 ends.

Figure 6:
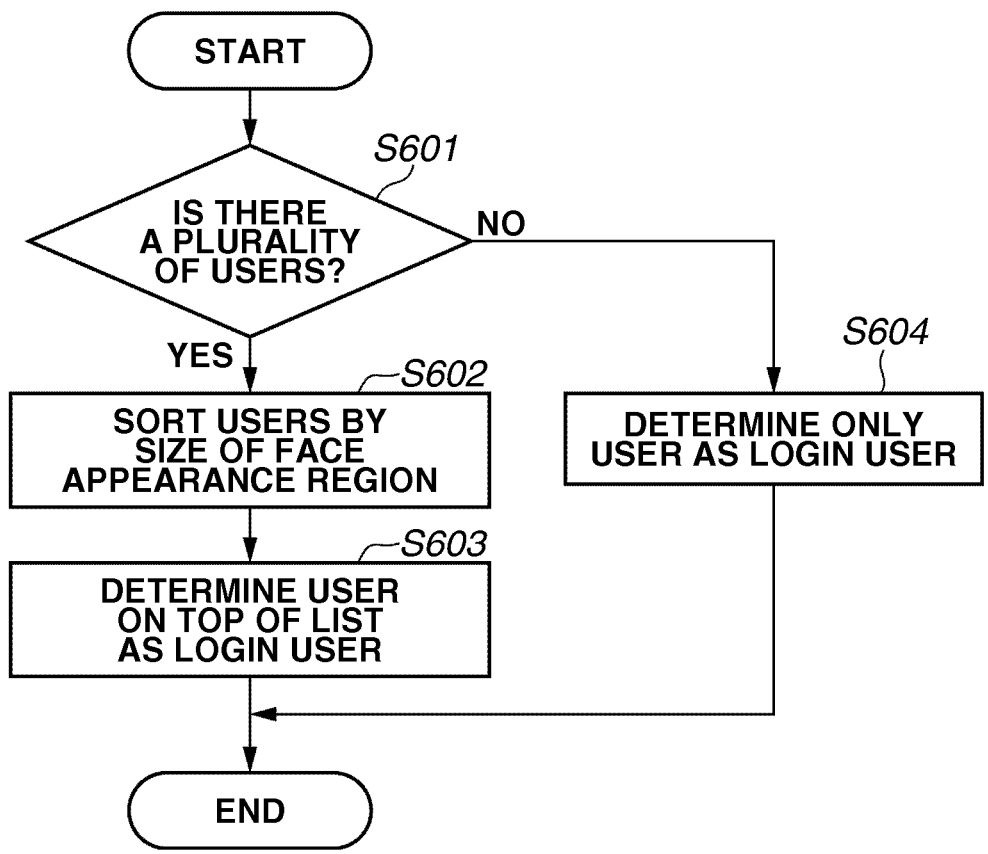
FIG. 6 is a flowchart illustrating priority order determination processing in detail.

When the processing in FIG. 5 ends, then in step S303, the CPU 101 determines a priority order. In the determination of the priority order, the CPU 101 determines a user (a login user) who is permitted to log in to the MFP 100. FIG. 6 is a flowchart illustrating the priority order determination processing in detail.

In step S601, the CPU 101 determines whether a plurality of users is registered in the user list. If only one user is registered in the user list (NO in step S601), then in step S604, the CPU 101 determines the only user registered in the user list as a login user.

If a plurality of users is registered in the user list (YES in step S601), the operation proceeds to step S602. In step S602, the CPU 101 sorts the user identification information within the user list in descending order of size of the face appearance region. Subsequently, in step S603, the CPU 101 determines the user corresponding to the user identification information listed in the top of the user list as a login user. That is, the login user is the user whose face is captured in the largest size. Accordingly, the CPU 101 determines the priority of one or a plurality of users registered in the user list according to the area of the face appearance region.

When the processing illustrated in FIG. 6 ends, then in step S304, the CPU 101 forms a user interface image. Herein, the CPU 101 forms image data indicating the user interface image for the login user in a video memory. The liquid crystal display 202 displays the user interface image for the login user based on the image data stored in the video memory.

The MFP 100 may have a function of allowing a user to customize the user interface. In such a case, the user interface customized by the user is displayed as the user interface image for the login user.

Alternatively, the MFP 100 may have a plurality of functions each of which is used by different users. In such a case, a user interface providing a function only usable by the login user is displayed as the user interface image for the login user.

The user interface image for the login user can include an image of a face of the login user detected in step S402.

In step S305, the CPU 101 determines whether the user has logged out of the MFP 100. If the user has logged out of the MFP 100 (YES in step S305), the operation returns to step S301.

When the user logs out of the MFP 100, the user presses a logout button displayed on the liquid crystal display 202 or a logout key on the hardware keypad 201. However, there is a possibility that the user who has just logged out of the MFP 100 may be detected in step S301. Consequently, the CPU 101 stores the user identification information of the logged out user in the RAM 103 for a certain time period as logged out user identification information. After the certain time period has elapsed, the CPU 101 deletes the logged out user identification information from the RAM 103. In step S502 illustrated in FIG. 5, if the logged out user identification information is being stored in the RAM 103, and the user identification information selected in step S501 matches the logged out user identification information, the operation proceeds to step S503.

In step S305, the camera 107 may always capture an image, whereas the CPU 101 may determine whether the captured image includes a face image of the login user. If the captured image does not include a face image of the login user, the CPU 101 determines that the login user has logged out of the MFP 100. In this method, there is a possibility that the CPU 101 may determine that the login user has left although the login user is present in front of the operation unit 105, depending on determination accuracy of the CPU 101 and behavior of the login user. Thus, if a state in which the captured image does not include the face image of the login user lasts longer than a certain time period, the CPU 101 can determine that the login user has logged out of the MFP 100.

According to the first exemplary embodiment, the MFP 100 can identify a user to be a login target by using the camera 107. When the login user left from a region in front of the operation unit 105, and another user stands in front of the operation unit 105, the MFP 100 can automatically determine this standing user as a login user. Moreover, even if a plurality of users is present in front of the operation unit 105, the MFP 100 can determine the nearest user to the operation unit 105 as a login user.

Moreover, the MFP 100 can automatically display a user interface image corresponding to a login user. Even if a plurality of users is present in front of the operation unit 105, the display of the user interface image corresponding to the login user can enable these users to readily recognize which user is the login user. This can suppress the use of the MFP 100 by a non-login user.

In the first exemplary embodiment, the MFP 100 determines the nearest user to the operation unit 105 as a login user, and displays a user interface image for the login user.

In a second exemplary embodiment, if there is a plurality of users identified by a camera 107, an MFP 100 enables the plurality of users to simultaneously log in to the MFP 100, and displays user interface images for the plurality of each users.

A hardware configuration of the MFP 100 according to the second exemplary embodiment is substantially the same as that illustrated in FIGS. 1 and 2.

In the second exemplary embodiment, a CPU 101 executes processing according to the flowchart illustrated in FIG. 3.

In step S301, the CPU 101 detects a person. An operation in step S301 according to the second exemplary embodiment differs from that in step S301 according to the first exemplary embodiment. The CPU 101 executes information processing based on a flowchart illustrated in FIG. 7 instead of the information processing based on the flowchart illustrated in FIG. 4.

Figure 7:
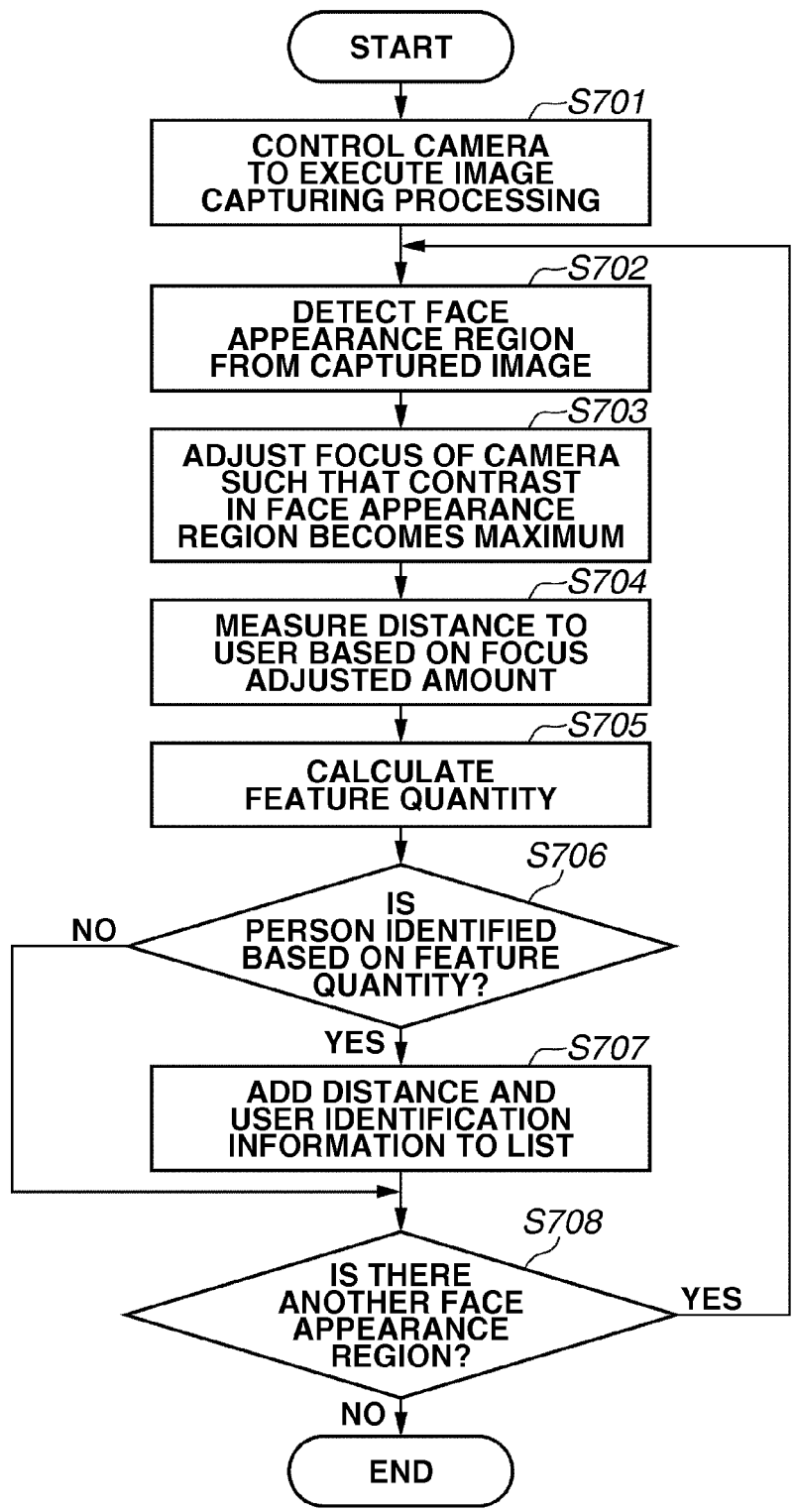
FIG. 7 is a flowchart illustrating person detection processing in detail according to a second exemplary embodiment.

FIG. 7 is a flowchart illustrating person detection processing in detail according to the second exemplary embodiment. In FIG. 7, a distance between an operation unit 105 and each user is determined based on an adjusted amount of automatic focus.

In step S701, the CPU 101 controls the camera 107 to execute image capturing processing. The image captured in step S701 is stored in a RAM 103 as bitmap image data.

In step S702, the CPU 101 performs image processing on the bitmap image data stored in the RAM 103, and detects one or a plurality of regions in each of which a face of a user is shown (hereinafter referred to as a face appearance region). Accordingly, the CPU 101 detects all the face appearance regions. In the second exemplary embodiment, the Haar-like feature classification technique is used as a method for detecting the face appearance region. Feature quantity data indicating a feature of the face of the user is generated beforehand by machine learning. According to the Haar-like feature classification technique, normalization processing by gray-scale conversion or edge detection processing is performed on the bitmap image data.

In step S703, the CPU 101 adjusts focus of the camera 107 such that contrast in one of the face appearance regions detected in step S702 becomes maximum.

In step S704, with a contrast autofocus technique of a digital camera, the CPU 101 measures a distance to the user based on the focus adjusted amount.

In step S705, with the Eigenface technique, the CPU 101 calculates a feature quantity from the face appearance region redetected in step S703.

In step S706, the CPU 101 determines whether the user is identified based on the feature quantity calculated in step S705. The operation in step S706 is substantially the same as that in step S404 illustrated in FIG. 4. If the user is identified (YES in step S706), the operation proceeds to step S707. In step S707, the CPU 101 acquires the user identification information from a first database, and adds the user identification information and the distance measured in step S704 to a user list. The user list is generated on the RAM 103.

In step S708, the CPU 101 determines whether there is another face appearance region for which the feature quantity is not calculated. If there is another face appearance region (YES in step S708), the CPU 101 executes the processing in steps S703 through S707 for this face appearance region. The CPU 101 executes the processing in steps S703 through S707 for each of all the face appearance regions detected in step S702.

When the processing illustrated in FIG. 7 ends, then in S302, the CPU 101 authenticates the person. An operation in step S302 according to the second exemplary embodiment is substantially the same as that in step S302 illustrated in FIG. 3 according to the first exemplary embodiment.

In step S303, the CPU 101 determines a priority order. An operation in step S303 according to the second exemplary embodiment differs from that in step S303 according to the first exemplary embodiment. The CPU 101 executes information processing based on a flowchart illustrated in FIG. 8 instead of the information processing based on the flowchart illustrated in FIG. 6.

Figure 8:
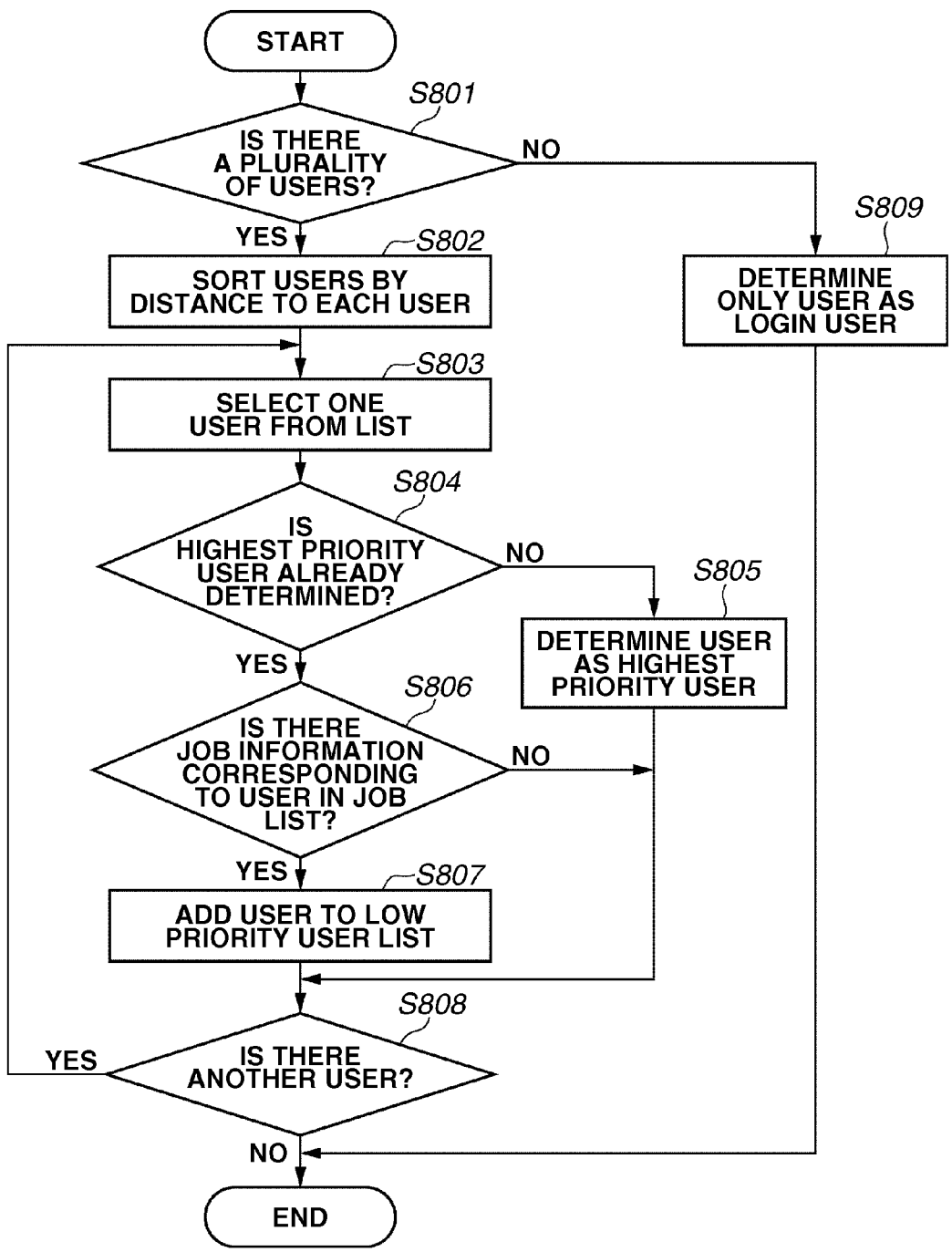
FIG. 8 is a flowchart illustrating priority order determination processing in detail according to the second exemplary embodiment.

FIG. 8 is a flowchart illustrating priority order determination processing in detail according to the second exemplary embodiment.

In example processing illustrated in FIG. 8, users included in the user list are classified into two categories such as a highest priority user and a low priority user. The highest priority user is a user now intending to use a copy function or a facsimile function, whereas the low priority user is a user having already input a job. In a case where there is a plurality of low priority users, these users are listed according to a predetermined priority (in the second exemplary embodiment, the shorter the distance from the operation unit 105, the higher the priority).

In step S801, the CPU 101 determines whether a plurality of users is registered in the user list. If only one user is registered in the user list (NO in step S801), then in step S809, the CPU 101 determines the only user registered in the user list as a login user.

If a plurality of users is registered in the user list (YES in step S801), the operation proceeds to step S802. In step S802, the CPU 101 sorts the user identification information within the user list. The user identification information is sorted in ascending order of distance to the operation unit 105. The distance is registered in the user list. Therefore, the CPU 101 determines, according to the distance, the priority of one user or the plurality of users registered in the user list.

In step S803, the CPU 101 selects the user identification information in order from the top of the user list.

In step S804, the CPU 101 determines whether the highest priority user is already determined. If the highest priority user is not yet determined (NO in step S804), then in step S805, the CPU 101 determines the user corresponding to the user identification information selected in step S803 as the highest priority user.

If the highest priority user is already determined (YES in step S804), the operation proceeds to step S806. In step S806, the CPU 101 searches for job information corresponding to the user identification information selected in step S803 from the RAM 103, and the CPU 101 determines whether such job information is found. The RAM 103 stores job information of a job input to the MFP 100, and job data to be processed by that job. The job information includes the user identification information identifying a user who has input a job, and status information indicating a status of the job. The RAM 103 manages one or a plurality of job information as a job list.

If there is the job information corresponding to the user identification information selected in step S803 in the RAM 103 (YES in step S806), then in step S807, the CPU 101 adds the user identification information selected in step S803 to a low priority user list.

In step S808, the CPU 101 determines whether there is another piece of user identification information in the user list. If there is another piece of user identification information (YES in step S808), then in step S803, the CPU 101 selects next user identification information. The CPU 101 executes the processing in steps S803 through S807 for each of all user identification information registered in the user list.

Figure 9:
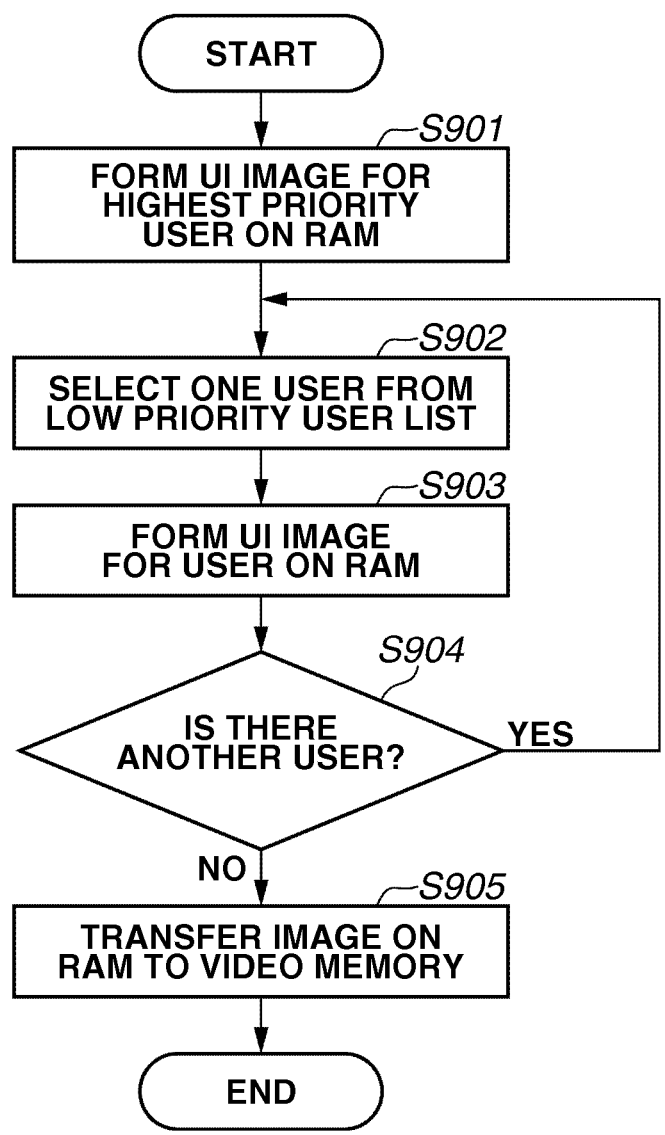
FIG. 9 is a flowchart illustrating formation processing of user interface image in detail according to the second exemplary embodiment.

When the processing illustrated in FIG. 8 ends, then in step S304, the CPU 101 forms a user interface image. The operation in step S304 according to the second exemplary embodiment differs from that in step S304 according to the first exemplary embodiment. FIG. 9 is a flowchart illustrating formation processing of user interface image in detail according to the second exemplary embodiment.

In step S901, the CPU 101 forms image data indicating a user interface image for the user determined as the highest priority user on the RAM 103.

In step S902, the CPU 101 selects user identification information of one user from the low priority user list. Subsequently, in step S903, the CPU 101 forms image data indicating the user interface image for that user. In FIG. 9, the user identification information is selected in order from the top of the low priority user list.

In step S904, the CPU 101 determines whether there is another piece of user identification information in the low priority user list. If there is another piece of user identification information (YES in step S904), then in step S902, the CPU 101 selects next user identification information.

The CPU 101 executes the processing in step S903 with respect to each of all the users registered in the low priority user list.

If the user interface images are formed for all of the users registered in the low priority user list (NO in step S904), the operation proceeds to step S905. In step S905, the CPU 101 transfers the image data formed on the RAM 103 to a video memory according to a predetermined layout. The liquid crystal display 202 displays the user interface image corresponding to each user based on the image data stored in the video memory.

Figure 10:
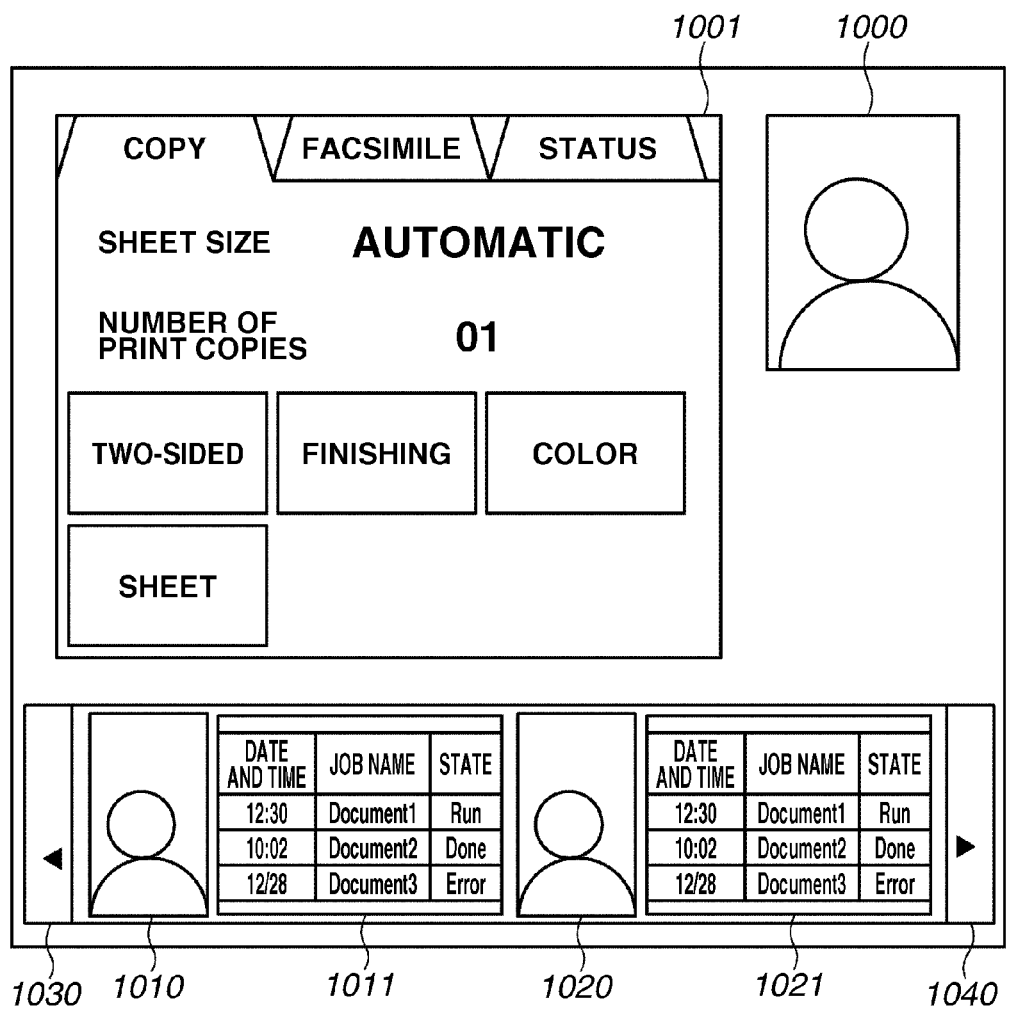
FIG. 10 is a diagram illustrating an example of a user interface image displayed on a liquid crystal display.

FIG. 10 is a diagram illustrating an example of the user interface image displayed on the liquid crystal display 202. Each of images 1000 and 1001 is a user interface image for the highest priority user. The image 1000 is an image of a face appearance region corresponding to the highest priority user. The image 1000 includes a face image so as to enable the highest priority user to be recognized among the plurality of users. The image 1001 is an operation screen prepared for the highest priority user, and includes buttons used to execute various functions. In the example diagram illustrated in FIG. 10, the image 1001 represents an operation screen displayed when a copy function is executed. With this screen, the highest priority user can designate two-sided printing, finishing processing, and a sheet to be used for printing, and select color/monochrome printing.

Images 1010 and 1011 are user interface images for one user (hereinafter called a user A) registered in the low priority user list. Moreover, images 1020 and 1021 are user interface images for another user (hereinafter called a user B) registered in the low priority user list. The images 1010 and 1020 are images of face appearance regions of the users A and B, respectively, to identify each user. The images 1011 and 1021 are operation screens prepared for the respective users A and B. In the example diagram illustrated in FIG. 10, each of the images 1011 and 1021 indicates a job list including jobs of each user. The job list indicates date and time on which the job is input to the MFP 100, a job name, and a state of the job. Each user can check progress of own job from the job list. For example, in a case where the users A and B respectively input a copy job and a facsimile job to the MFP 100 having a copy function and a facsimile function, a list of copy jobs is shown in the image 1011 and a list of facsimile jobs is shown in the image 1021.

Buttons 1030 and 1040 are used to display user interface images of other users. In the example diagram illustrated in FIG. 10, the user interface images corresponding to the two users are displayed, while user interface images of other users are hidden. When the button 1030 or the 1040 is pressed, the CPU 101 transfers the image data formed on the RAM 103 to the video memory again to switch the user interface images to be displayed on the liquid crystal display 202.

In step S905 illustrated in FIG. 9, the CPU 101 transfers the user interface image data formed on the RAM 103 to the video memory such that the user interface image is displayed as the diagram illustrated in FIG. 10. In the example diagram illustrated in FIG. 10, the CPU 101 first transfers the user interface image data corresponding to top two users registered in the low priority user list to the video memory. Secondly, the CPU 101 transfers the user interface image data corresponding to the other users to the video memory when the buttons 1030 or 1040 is pressed.

According to the second exemplary embodiment, therefore, a plurality of user interface images for each user can be displayed simultaneously. Particularly, an operation screen used to execute each function can be displayed for the highest priority user who now intends to use the function such as a copy function, whereas a job list can be displayed for the low priority user who has already input a job. Accordingly, the convenience of the user operating the MFP 100 cannot be deteriorated, while the information about a job of another user is displayed on the liquid crystal display 202. Even when one user is operating the MFP 100, another user can see the information about a job thereof with a quick look at the liquid crystal display 202.

In the second exemplary embodiment, moreover, since a distance between each user and the camera 107 is estimated based on a focus adjusted amount, a distance between each user and the operation unit 105 can be estimated with higher accuracy.

Moreover, in the method of priority order determination described with reference to FIG. 8, the user who has input a job is registered in the low priority user list, that is, not all the users whose faces are captured are registered in the low priority user list. Accordingly, a user to be registered in the low priority user list is selected according to a predetermined condition, thereby preventing a situation where a user who does not need to log in logs in to the MFP 100. In addition, the user interface image can be displayed only for an appropriate user.

In the person detection method described with reference to FIG. 7, the camera 107 is used to identify a user. However, a card reader may be used to identify a user. In such a case, the MFP 100 includes the card reader instead of the camera 107, or in addition to the camera 107. The card reader reads user identification information from an identification card (ID card) of each user, and the CPU 101 adds the user identification information read by the card reader to the user list. A plurality of users sequentially brings each ID card near to the card reader. Thus, the user corresponding to the user identification information read first by the card reader becomes a highest priority user, and the user corresponding to the user identification information read afterward by the card reader becomes a low priority user.

On the other hand, in the method for identifying a user with the camera 107, users do not need to bring each ID card near to the card reader. Consequently, the method for identifying a user with the camera 107 can be more convenient for users than the method with ID cards.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Moreover, a control circuit designed to execute the processing based on each of the flowcharts may be used instead of the CPU 101.

According to the above-described exemplary embodiments, even when a plurality of users is detected by an image capturing unit, a user interface image of at least one user among the plurality of users can be displayed.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-239278 filed Oct. 30, 2012, which is hereby incorporated by reference herein in its entirety.

What is claimed is:

1. An information processing apparatus comprising:
    an image capturing unit configured to generate image data by capturing an image;
    an identification unit configured to identify a plurality of users based on the image data; and
    a display unit configured to display an operation screen used to operate the information processing apparatus for a first user, and display a job list corresponding to a second user,
    wherein a user whose job list is displayed is changed in accordance with an instruction by a user.

2. The information processing apparatus according to claim 1, wherein the image capturing unit captures an image in a viewing angle range of the display unit.

3. The information processing apparatus according to claim 1, further comprising:
    a determination unit configured to determine a user whose priority is higher than another one of the plurality of users,
    wherein the determination unit determines the user based on the image data, and the operation screen for the determined user is displayed.

4. The information processing apparatus according to claim 3, further comprising a detection unit configured to detect a region indicating a face of each user,
    wherein the determination unit determines the user according to size of the region detected by the detection unit.

5. The information processing apparatus according to claim 1, further comprising:
    a determination unit configured to determine a user whose priority is higher than another one of the plurality of users; and
    an estimation unit configured to estimate a distance between each user and the image capturing unit,
    wherein the determination unit determines the user according to the distance estimated by the estimation unit, and the operation screen for the determined user is displayed.

6. The information processing apparatus according to claim 5, wherein the estimation unit estimates the distance between each user and the image capturing unit according to a focus adjusted amount of the image capturing unit.

7. The information processing apparatus according to claim 1, further comprising:
    a determination unit configured to determine a user whose priority is higher than another one of the plurality of users,
    wherein the determination unit classifies the plurality of users into a first priority user and a second priority user having a lower priority than the first priority user, and
    wherein the display unit displays an operation screen for the first priority user and an operation screen for the second priority user.

8. The information processing apparatus according to claim 7, wherein the operation screen for the first priority user is laid out larger than the operation screen for the second priority user.

9. The information processing apparatus according to claim 7, wherein the operation screen for the first priority user is used to execute a function of the information processing apparatus, and the operation screen for the second priority user indicates a state of a job of the second priority user.

10. The information processing apparatus according to claim 9, wherein the determination unit sets a user whose job has been input to the information processing apparatus as the second priority user.

11. The information processing apparatus according to claim 1, further comprising a generation unit configured to generate image data indicating the operation screen.

12. An information processing method executed by an information processing apparatus, the information processing method comprising:
    controlling an image capturing unit for generating image data by capturing an image;
    identifying a plurality of users based on the image data; and
    displaying an operation screen used to operate the information processing apparatus for a first user, and displaying a job list corresponding to a second user,
    wherein a user whose job list is displayed is changed in accordance with an instruction by a user.

13. The information processing method according to claim 12, further comprising:
    determining the priority based on the image data;
    determining a user whose priority is higher than another one of the plurality of users; and
    displaying the operation screen for the determined user.

14. The information processing method according to claim 13, further comprising:
    detecting a region indicating a face of each user based on the image data; and
    determining the user according to size of the detected region.

15. The information processing method according to claim 12, further comprising:
    estimating a distance between each user and the image capturing unit;
    determining a user whose priority is higher than another one of the plurality of users according to the estimated distance; and
    displaying the operation screen for the determined user.

16. The information processing method according to claim 15, further comprising estimating the distance between each user and the image capturing unit according to a focus adjusted amount of the image capturing unit.

17. The information processing method according to claim 12, further comprising:
    classifying the plurality of users into a first priority user and a second priority user having a lower priority than the first priority user; and
    displaying an operation screen for the first priority user and an operation screen for the second priority user on the display unit.

18. The information processing method according to claim 17, wherein the operation screen for the first priority user is used to execute a function of the information processing apparatus, and the operation screen for the second priority user indicates a state of a job of the second priority user.

19. A non-transitory computer readable storage medium storing computer executable instructions that causes a computer to execute a method comprising:
- controlling an image capturing unit to generate image data by capturing an image;
- identifying a plurality of users based on the image data; and
- displaying an operation screen used to operate the information processing apparatus for a first user and displaying a job list corresponding to a second user,
- wherein a user whose job list is displayed is changed in accordance with an instruction by a user.

20. An information processing apparatus comprising:
- an image capturing unit configured to generate image data by capturing an image;
- a memory that stores a set of instructions;
- at least one processor that executes the instructions to:
  - identify a plurality of users based on the image data; and
- a display unit configured to display an operation screen used to operate the information processing apparatus for a first user and display a job list corresponding to a second user,
- wherein a user whose job list is displayed is changed in accordance with an instruction by a user.

\* \* \* \* \*